US005812120A

United States Patent [19]

[11] Patent Number: 5,812,120
[45] Date of Patent: Sep. 22, 1998

Shim

[54] BNC/D-SUB SIGNAL AUTO-SELECTION CIRCUIT

[75] Inventor: Jae-Gyou Shim, Suwon, Rep. of Korea

[73] Assignee: SamSung Electronics Co., Ltd., Suwon, Rep. of Korea

[21] Appl. No.: 725,895

[22] Filed: Oct. 4, 1996

[30] Foreign Application Priority Data

Oct. 4, 1995 [KR] Rep. of Korea .................. 33915/1995

[51] Int. Cl.[6] ............................ G09G 5/00; H04N 5/268

[52] U.S. Cl. ............................................ 345/204; 348/705

[58] Field of Search .................................... 348/705, 694, 348/689; 345/204, 13

[56] References Cited

U.S. PATENT DOCUMENTS

| | | | |
|---|---|---|---|
| 4,319,278 | 3/1982 | Shimizu | 348/705 |
| 4,612,577 | 9/1986 | Keen | 348/705 |
| 4,954,880 | 9/1990 | Tanimizu | 348/705 |
| 5,109,219 | 4/1992 | Kastan et al. . | |
| 5,305,105 | 4/1994 | Heo | 348/705 |
| 5,343,255 | 8/1994 | Lagoni | 348/678 |
| 5,407,366 | 4/1995 | Briones et al. | 439/639 |
| 5,475,402 | 12/1995 | Hijikata . | |
| 5,519,414 | 5/1996 | Gold et al. . | |
| 5,561,478 | 10/1996 | Machado | 348/706 |
| 5,686,974 | 11/1997 | Nayebi et al. | 348/705 |
| 5,689,309 | 11/1997 | Nayebi et al. | 348/584 |

*Primary Examiner*—Jeffery Brier
*Assistant Examiner*—David L. Lewis
*Attorney, Agent, or Firm*—Robert E. Bushnell, Esq.

[57] ABSTRACT

A circuit for automatically selecting between the BNC or the D-SUB includes a detector for discriminating a signal currently being input by D-SUB or BNC synchronizing signals input from a computer system. Responsive to a control signal input from the detector, a D-SUB/BNC selecting integrated circuit for generating a predetermined operating signal to either a D-SUB driving circuit or BNC driving circuit.

15 Claims, 2 Drawing Sheets

BNC/D-SUB SIGNAL AUTO-SELECTION CIRCUIT

CLAIM OF PRIORITY

This application makes reference to, incorporates the same herein, and claims all benefits accruing under 35 U.S.C. §119 from an application for BNC/D-SUB SIGNAL AUTO-SELECTION CIRCUIT earlier filed in the Korean Industrial Property Office on 4 Oct. 1995 and there duly assigned Ser. No. 33915/1995.

FIELD OF INVENTION

The present invention relates to a signal selection circuit, and more particularly, to video signal selection circuit for use with a computer system driving a variable visual monitor.

BACKGROUND OF THE INVENTION

Contemporary practice in the art typically uses one of two methods electrically connecting a monitor with a computer system. One method uses a D-SUB arrangement for electrically connecting a computer system with a monitor. In a D-SUB arrangement, transmission lines for red, green and blue video signals as well as the synchronizing signal transmission line, are provided in a single cable line. Another method uses what is known as a BNC arrangement. In a BNC arrangement, separate cable lines are employed for a transmission line of a video signal comprising red, green and blue component signals and for a transmission line of a synchronizing signal. Thus, a BNC arrangement uses electrical conduction between a computer and a monitor.

Of the two, the BNC method has relatively superior performance at high frequencies compared to the D-SUB method. Due to its relatively superior performance at high frequencies, the BNC method is often employed in executing programs that utilize high frequencies (e.g., a computer aided design/computer aided manufacture programs—CAD/CAM). Due to its relatively inferior performance at high frequencies, the D-SUB method is often utilized with software such as an operating system (OS) program. A computer system may be operated while running only programs that do not require high frequencies (e.g., an operating system (OS) such as the disk operating system (DOS)) or may be required to run programs that require high frequencies (e.g., CAD/CAM software), or occasionally run an operating system (OS) software with a utility software. As these circumstances dictate, either the BNC method or the D-SUB method is the proper and appropriate choice.

In contemporary practice, there are two ways for establishing an electrical conduction path between a computer system and a monitor so as to utilize either the BNC method or D-SUB method. First, there is a switch selection method in which either the BNC method or the D-SUB method is manually selected by a user's manipulation of a switch. This switch selection method does not permit taking into account the characteristics of signals being applied to a monitor from a computer system. Second, there is the automatic relaying operation where the choice between the BNC method and the D-SUB method is executed in response to a signal input from a computer system by employing a relay circuit, so as to automatically switch between the BNC cable and the D-SUB cable.

I have observed that each of the above explained methods have drawbacks. First, the switch selection method requires the user to undertake the inconvenience of switch manipulation, an inherently slow manual process. Second, the automatic relaying operation method requires a relay. When using a relay, it takes a while to detect a signal being input from a computer system to a monitor. In addition, an increased contact resistance due to repeated switching operations of a relay can cause wear and tear on the relay, as well as signal deterioration. After a relay has been used for a substantial amount of time, the relay may occasionally malfunction or the relay may become noisy in operation. Moreover, this process is relative slow in comparison to contemporary switching circuit practice.

Exemplars of the contemporary art lack an effective video signal selection circuit for use with a computer system and a monitor. Gold et al. (U.S. Pat. No. 5,519,414, Video Display and Driver Apparatus and Method, May 21, 1996) discusses creating visual images on a display area. The signal control equipment selectively delays transmission of signals. Hijikata (U.S. Pat. No. 5,475,402, Display Control Apparatus and method, Dec. 12, 1995) discusses generating control signals including video data in a process where video data is first converted into a digital RGB signal, then converted into an analog RGB signal. While Kastan et al. (U.S. Pat. No. 5,109,219, Method and Apparatus for Controlling and Adjusting the Viewing Angle of a Liquid Crystal Display, Apr. 28, 1992) discusses controlling a display. By converting the digital code into an analog signal, this type of control is suitable for microprocessor controlled displays. Based upon my study of contemporary art, I believe that there is a need for effective circuits that select between BNC and D-SUB signals using automatic detection and discrimination of signals from a computer system and generate video signals.

SUMMARY OF THE INVENTION

Accordingly, it is an object of the present invention to provide an improved a signal selection circuit.

It is another object to provide a video signal selection circuit for use with a computer system driving a video monitor.

It is still another object to provide an improved circuit for automatically selecting between an BNC connection signal and D-SUB connection signal for a monitor.

It is yet another object to provide an automatic signal selection circuit for selecting between a BNC connection and a D-SUB connection based on a signal input to a monitor from a computer system.

It is still yet another object to provide a video signal selection circuit able to selectively perform switching operations between different video signals, on the basis of one or more characteristics of those signals.

It is also an object to provide an automatic signal selection circuit for a monitor that eliminates malfunctions caused by worn relay contacts and eliminates relay contact noise.

To achieve these and other objects, there is provided an automatic signal selection circuit for use with a monitor that includes a detector for discriminating a signal currently being input. The signal to be discriminated are one of the synchronizing signals input from a computer system via one of either the BNC or the D-SUB connections. This detector controls a D-SUB/BNC selecting integrated circuit (IC). The D-SUB/BNC selecting integrated circuit generates an operational signal to either an D-SUB driving circuit or an BNC driving circuit. This generation of the operational signal is responsive to a control signal input from the detector. The D-SUB driving circuit generates a D-SUB video signal to a cathode ray tube CRT responsive to a signal output from the D-SUB/BNC selecting integrated circuit. The BNC driving circuit generates a BNC video signal to a cathode ray tube CRT responsive to a signal output from the D-SUB/BNC selecting integrated circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
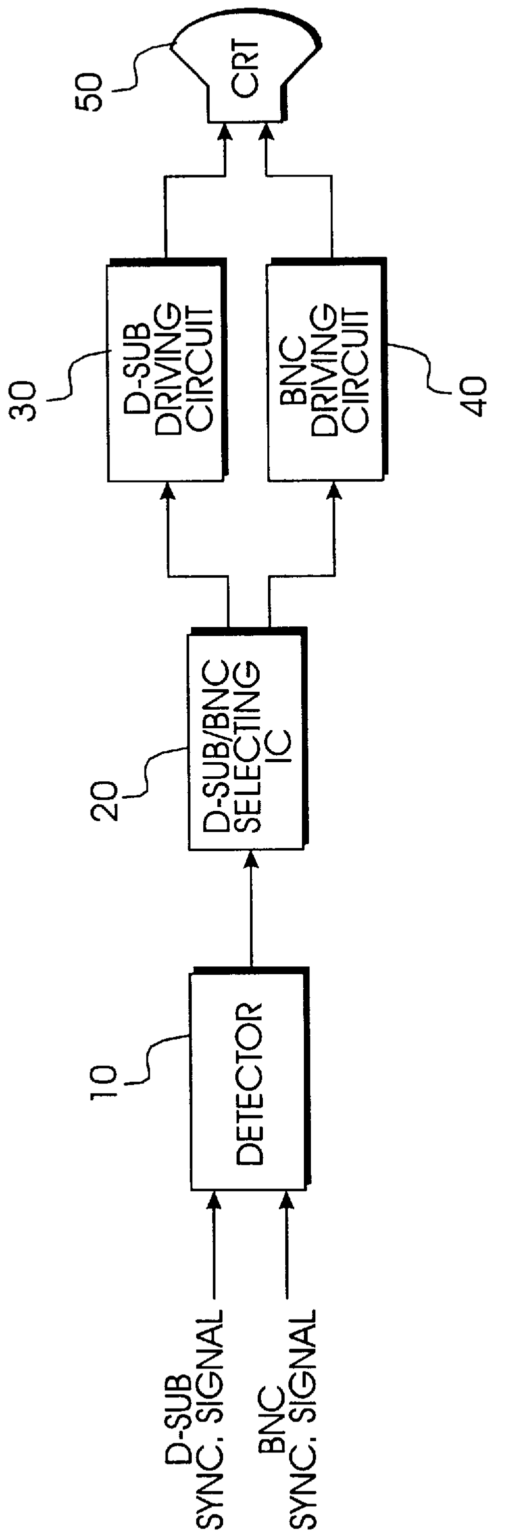
FIG. 1 is a schematic block diagram of a BNC/D-SUB signal automatic selection circuit constructed according to the principles of the present invention.

Turning now to the drawings, a block diagram of a BNC/D-SUB signal automatic selection circuit according to an embodiment of the present invention is shown in FIG. 1. The circuit illustrated in FIG. 1 includes a detector 10 for discriminating signal inputs. The signal inputs are from either a D-SUB synchronizing signal or a BNC synchronizing signal. Both types of signals, the D-SUB synchronizing signals and the BNC synchronizing signals, are input from a computer system so as to be eventually sent to a monitor associated with the computer systems. A BNC/D-SUB selecting integrated circuit IC 20 generates a predetermined operation signal to either a D-SUB driving circuit 30 or a BNC driving circuit 40. In this generation of the predetermined operation signal, the BNC/D-SUB selecting integrated circuit 20 is responsive to a control signal input from detector 10. The previously mentioned D-SUB driving circuit 30 generates a D-SUB video signal comprising red, green, and blue component signals to cathode ray tube (CRT) 50. In this generation of the D-SUB video signal, the D-SUB driving circuit 30 is responsive to a signal output from BNC/D-SUB selecting integrated circuit IC 20. The previously mentioned BNC driving circuit 40 generates a BNC video signal to cathode ray tube (CRT). In this generation of a BNC video signal, the BNC driving circuit 40 is responsive to a signal output from D-SUB/BNC selecting integrated circuit IC 20. The cathode ray tube CRT 50 displays, on its screen, a signal transmitted from a computer system. This signal from the computer system is supplied to the CRT 50 from either the D-SUB driving circuit 30 or the BNC driving circuit 40.

Figure 2:
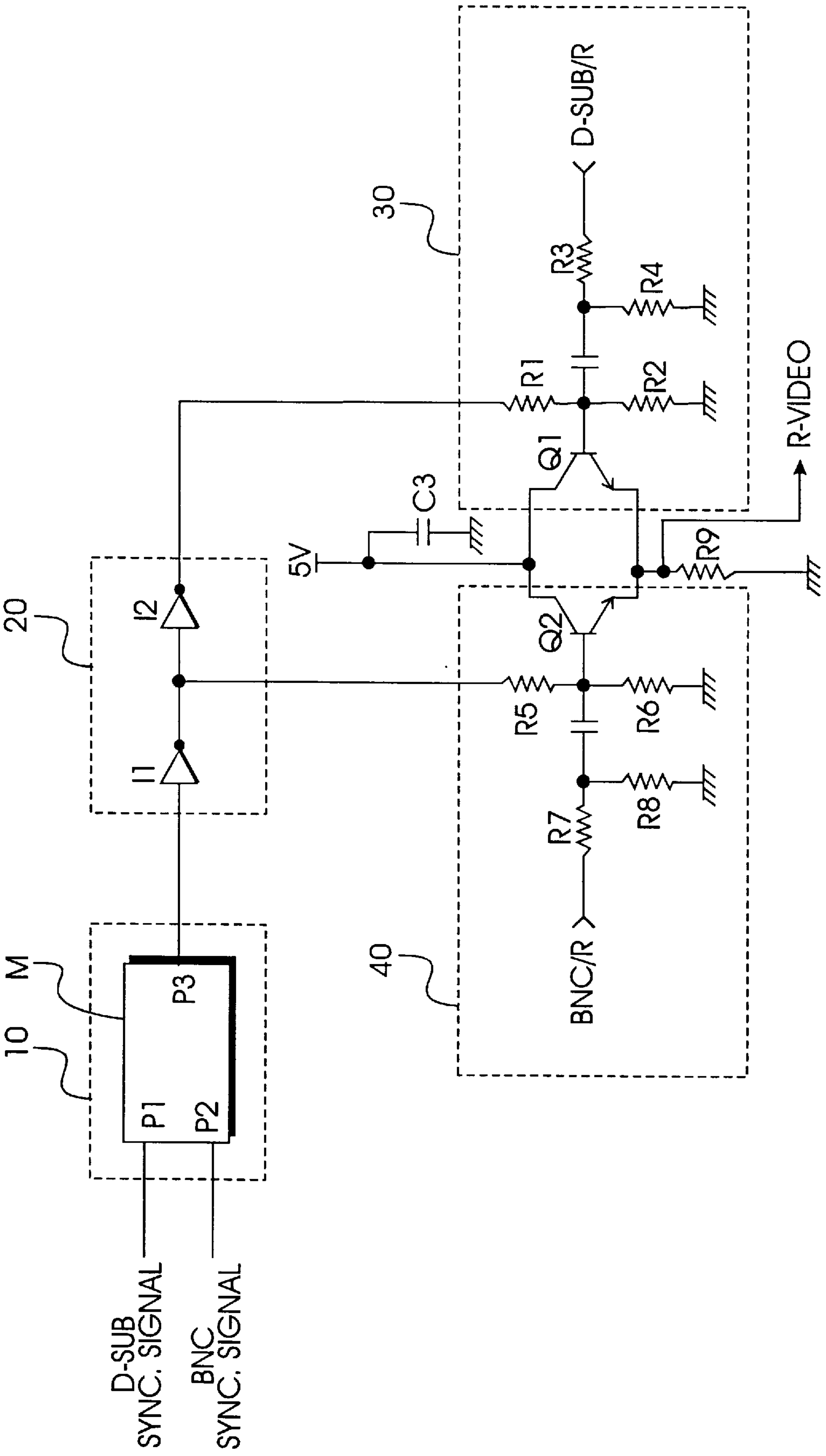
FIG. 2 is a detailed circuit diagram of a circuit constructed according to the principles of the present invention.

A detailed circuit of a preferred embodiment is illustrated in FIG. 2. Such a circuit can handle many types of signals. For the sake of brevity, the following explanation gives one example among many possible examples: use of a red signal; among video component signals, a red signal will be assumed to be applied from a computer system. This becomes critical in choosing among D-SUB driving circuit 30 and BNC driving circuit 40.

These circuits are part of the overall handling of signals in the system of the present invention. As previously noted, the synchronization signals do not directly arrive at the driving circuit 30 and the driving circuit 40. Instead, the D-SUB synchronization signals and the BNC synchronization signals arrive at the detector 10.

Preferably, this detector 10 comprises a microcomputer M or an analogous manufacture. The detector 10 has an input terminal P1 connected to a D-SUB connection cable and an another input terminal P2 connected to a BNC connection cable. The D-SUB connection cable and the BNC connection cable are for receiving D-SUB synchronization signals and BNC synchronization signals respectively. Detector 10 has an output terminal P3 connected to an input terminal of the D-SUB/BNC selecting integrated circuit IC 20. The output terminal P3 gives a signal output from the detector 10. The signal output is used as a first control signal.

As previously noted, this first control signal is generated upon applying signals to the input terminals P1 and P2. Upon applying a D-SUB synchronizing signal to the input terminal P1, the microcomputer M generates a signal of high voltage level to be transmitted from the output terminal P3. Upon applying a BNC synchronizing signal to the input terminal P2, microcomputer M generates a signal of low voltage level to be transmitted from output terminal P3.

D-SUB/BNC selecting integrated circuit IC 20 comprises a pair of invertors I1 and I2. The inverter I2 is serially connected to inverter I1; an output terminal of the inverter I1 is connected to an input terminal of the inverter I2. An output terminal of an inverter I2 is connected to an an input terminal of D-SUB driving circuit 30. The output terminal of another inverter I1 is connected to an input terminal of BNC driving circuit 40. The signal output from D-SUB/BNC selecting integrated circuit IC 20 is used as a second control signal.

The D-SUB driving circuit 30 has an input terminal that receives a signal from the D-SUB/BNC selecting integrated circuit IC 20. In the D-SUB driving circuit 30, a signal from an input terminal of D-SUB driving circuit 30 applied from an output terminal of an inverter I2 is voltage-divided by a serially connected resistors R1 and R2. Then, the signal is applied to a base electrode of transistor Q1.

As noted previously, the D-SUB driving circuit 30 not only accepts signals from the D-SUB/BNC selecting integrated circuit (IC) 20, but also accepts other signals from the computer system; the D-SUB driving circuit 30 drives signals as well as accepting selection information from the D-SUB/BNC selecting IC 20. A red video component signal of D-SUB signal D-SUB/R, transmitted from a computer system, is voltage-divided by a pair of resistors R3 and R4. Upon the voltage division, the signal is supplied to a base electrode of a transistor Q1 through a capacitor C1.

The transistor Q1 has the base electrode, a collector electrode, and an emitter electrode. The collector electrode of the transistor Q1 is connected to a constant voltage source (5 V) and is also connected to a capacitor C3. The capacitor C3 is connected to the ground. The emitter electrode of the transistor Q1 connected to a resistor R9. The resistor R9 is connected to the ground. At a junction node between the emitter electrode of transistor Q1 and a lead of resistor R9 (the lead away from the ground), a red component signal R-VIDEO is generated. Due to the resistor R9, the red video component signal R-VIDEO is supplied to an input terminal of a cathode ray tube.

As noted previously, the BNC driving circuit 40 has an input terminal that receives a signal from the D-SUB/BNC selecting integrated circuit IC 20. In the BNC driving circuit 40, a signal from an input terminal of BNC driving circuit 40 applied from an output terminal of an inverter I2 is voltage-divided by a serially connected resistors R5 and R6. Then, the signal is applied to a base electrode of transistor Q1.

As noted previously, the BNC driving circuit 40 not only accepts signals from the D-SUB/BNC selecting integrated circuit (IC) 20, but also accepts other signals from the computer system; the BNC driving circuit 40 drives signals as well as accepting selection information from the D-SUB/BNC selecting IC 20. A red video component signal of D-SUB signal D-SUB/R, transmitted from a computer system, is voltage-divided by a pair of resistors R7 and R8. Upon the voltage division, the signal is supplied to a base electrode of a transistor Q2 through a capacitor C2.

The transistor Q2 has the base electrode, a collector electrode, and an emitter electrode. The collector electrode of the transistor Q2 is connected to the previously mentioned constant voltage source (5 V) and is also connected to the previously mentioned capacitor C3. The capacitor C3 is connected to the ground. The emitter electrode of the transistor Q2 connected to the previously mentioned resistor R9. The resistor R9 is connected to the ground. At a junction node between the emitter electrode of transistor Q2 and a lead of resistor R9 (the lead away from the ground), a red component signal R-VIDEO is generated. Due to the resistor R9, the red video component signal R-VIDEO is supplied to an input terminal of a cathode ray tube.

Now, by way of a non-limiting example, an operation of a preferred embodiment of the present invention will be described in greater detail.

Upon receiving a D-SUB signal output from a computer system, a D-SUB synchronizing signal is fed to the input terminal P1 of the microcomputer M. When the synchronization signal is received into the input terminal P1, the microcomputer M generates a high voltage signal at its output terminal P3. The high voltage signal generated from an output terminal P3 is inverted by the inverter I1 in D-SUB/BNC selecting integrated circuit IC 20. Then, the inverted signal is fed to an input terminal of BNC driving circuit 40. The previously mentioned inverted signal from the inverter I1 is again inverted by the inverter I2. Then, this re-inverted signal, of high voltage level, is fed to an input terminal of D-SUB driving circuit 30.

As a result, a low voltage level signal output at an output terminal of inverter I1 is applied to a base electrode of transistor Q2 in BNC driving circuit 40, using a pair of serially connected voltage-divider resistors R5 and R6. This turns off the transistor Q2. A high voltage level signal output at an output terminal of inverter I2 is applied to a base electrode of transistor Q1 in D-SUB driving circuit 30, using a pair of resistors R1 and R2. This turns on the transistor Q1.

When transistor Q1 is turned on, a red video component signal D-SUB/R in a D-SUB signal is applied, using a pair of resistors R3 and R4, the capacitor C1, the base electrode of transistor Q1, and the emitter electrode of transistor Q1. The red video component signal R-VIDEO is generated at the junction between a lead of the resistor R9 and the emitter electrode of transistor Q1. The R-VIDEO is applied to cathode ray tube CRT.

For the sake of brevity in explanation, a red video component signal has been used as an example in the explanation. It is understood however that a green video component signal as well as blue is applied to cathode ray tube via respective D-SUB driving circuit 30.

Upon receiving a BNC signal output from a computer system, a BNC synchronizing signal is fed to the input terminal P2 of the microcomputer M. When the synchronization signal is received into the input terminal P2, the microcomputer M generates a low voltage signal at its output terminal P3. The low voltage signal generated from an output terminal P3 is inverted by the inverter I1 in D-SUB/BNC selecting integrated circuit IC 20. Then, the inverted signal is fed to an input terminal of BNC driving circuit 40. The previously mentioned inverted signal from the inverter I1 is again inverted by the inverter I2. Then, this re-inverted signal, of low voltage level, is fed to an input terminal of D-SUB driving circuit 30.

As a result, a low voltage level signal output at an output terminal of inverter I2 is applied to a base electrode of transistor Q1 in D-SUB driving circuit 30, using a pair of serially connected voltage-divider resistors R1 and R2. This turns off the transistor Q1. A high voltage level signal output at an output terminal of inverter I1 is applied to a base electrode of transistor Q2 in BNC driving circuit 40, using a pair of resistors R5 and R6. This turns on the transistor Q2.

When transistor Q2 is turned on, a red video component signal BNC/R in a BNC signal is applied, using a pair of resistors R7 and R8, the capacitor C2, the base electrode of transistor Q2, and the emitter electrode of transistor Q2. The red video component signal R-VIDEO is generated at the junction between a lead of the resistor R9 and the emitter electrode of transistor Q2. The R-VIDEO is applied to cathode ray tube CRT.

For the sake of brevity in explanation, a red video component signal has been used as an example in the explanation. It is understood however that a green video component signal as well as blue is applied to cathode ray tube via respective BNC driving circuit 30.

As previously mentioned, the D-SUB driving circuit 30 is activated when the first control signal output from detector 10 and the second control signal output from D-SUB/BNC selecting Integrated circuit IC 20 are of same voltage level. If the two signals (the first control signal and the second control signal) are of opposite polarity, then the BNC driving circuit 40 is activated.

As explained above, a preferred embodiment according to the present invention is able to amplify individual video component signals such as RGB signals, and enables automatic selection of either BNC or BNC driving circuit for respective video components signals, thereby enhancing response characteristics of the circuit.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mods contemplated for carrying out the present invention, but that the present invention includes all embodiments failing within the scope of the appended claims.

What is claimed is:

1. A circuit for automatically selecting video signals from a computer system, said circuit comprising:

a detector having an integrated circuit device, said detector disposed to receive a video signal generated by a computer system to drive a video display appearing on a video monitor, and to generate a first control signal in dependence upon identification by said detector of said video signal as one of a D-SUB synchronization signal and a BNC synchronization signal;

a divider circuit disposed to receive the first control signal from said detector, to generate a second signal by inverting the first control signal, and to generate a third signal by inverting the second signal;

a D-SUB driving circuit disposed to receive the third signal from the divider circuit and to generate a D-SUB video signal in dependence upon the third signal being of a first voltage level; and a BNC driving circuit disposed to receive the second signal from the divider circuit and to generate a BNC video signal in dependence upon the second signal being of a second voltage level;

wherein said detector comprises a first input terminal disposed to receive D-SUB synchronization signals, a second input terminal disposed to receive BNC synchronization signals, an output terminal connected to said divider circuit, and a microcomputer; and wherein said divider circuit comprises first and second inverters, each of the first and second inverters having an input terminal and an output terminal, said output terminal of said first inverter being connected to an input terminal of said D-SUB driving circuit, and said output terminal of said second inverter being connected to an input terminal of said BNC driving circuit.

2. The circuit of claim 1, wherein said D-SUB driving circuit further comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and second electrode via said channel, said first electrode connectable to a constant voltage source, said second electrode coupled to send video signals;

a first node connected to said first resistor, a second resistor, a capacitor, and said third electrode;

a second node connected to said capacitor, a third resistor, and a fourth resistor;

a second input terminal connected to said fourth resistor, said second input terminal coupled to receive video signals.

3. The circuit of claim 1, wherein said BNC driving circuit comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and second electrode via said channel, said first electrode connectable to a constant voltage source, said second electrode coupled to send video signals;

a first node connected to said first resistor, a second resistor, a capacitor, and said third electrode;

a second node connected to said capacitor, a third resistor, and a fourth resistor;

a second input terminal connected to said fourth resistor, said second input terminal coupled to receive video signals.

4. The circuit of claim 1, wherein the D-SUB video signals and the BNC video signals are transmitted to a display apparatus having a liquid crystal display.

5. The circuit of claim 1, wherein the D-SUB driving circuit is activated to transmit D-SUB video signals when the first control signal is of a third voltage level.

6. The circuit of claim 1, wherein said BNC driving circuit is activated to transmit BNC video signals when the first control signal is of a fourth voltage level.

7. A circuit for automatically selecting video signals from a computer system, said circuit comprising:

a detector having an integrated circuit device, said detector disposed to receive a video signal generated by a computer system to drive a video display appearing on a video monitor, and to generate a first control signal in dependence upon identification by said detector of said video signal as one of a D-SUB synchronization signal and a BNC synchronization signal;

a divider circuit disposed to receive the first control signal from said detector, to generate a second signal by inverting the first control signal, and to generate a third signal by inverting the second signal;

a D-SUB driving circuit disposed to receive the third signal from the divider circuit and to generate a D-SUB video signal in dependence upon the third signal being of a first voltage level; and a BNC driving circuit disposed to receive the second signal from the divider circuit and to generate a BNC video signal in dependence upon the second signal being of a second voltage level;

wherein said D-SUB driving circuit further comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and said second electrode via said channel, said first electrode being connectable to a constant voltage source, said second electrode being coupled to send video signals;

a first node connected to said first resistor, a second resistor, a capacitor, and said third electrode;

a second node connected to said capacitor, a third resistor, and a fourth resistor; and a second input terminal connected to said fourth resistor, said second input terminal being coupled to receive video signals; and wherein said semiconductor is turned on when the first control signal is of a third voltage level, so as to transmit D-SUB video signals to a display apparatus.

8. A circuit for automatically selecting video signals from a computer systems, said circuit comprising:

a detector having an integrated circuit device, said detector disposed to receive a video signal generated by a computer system to drive a video display appearing on a video monitor, and to generate a first control signal in dependence upon identification by said detector of said video signal as one of a D-SUB synchronization signal and a BNC synchronization signal;

a divider circuit disposed to receive the first control signal from said detector, to generate a second signal by inverting the first control signal, and to generate a third signal by inverting the second signal;

a D-SUB driving circuit disposed to receive the third signal from the divider circuit and to generate a D-SUB video signal in dependence upon the third signal being of a first voltage level; and a BNC driving circuit disposed to receive the second signal from the divider circuit and to generate a BNC video signal in dependence upon the second signal being of a second voltage level;

wherein said BNC driving circuit comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and second electrode via said channel, said first electrode being connected to a constant voltage source, said second electrode being coupled to send video signals;

a first node connected to said first resistor, a second resistor, a capacitor, and said third electrode;

a second node connected to said capacitor, a third resistor, and a fourth resistor; and a second input terminal connected to said fourth resistor, said second input terminal being coupled to receive video signals; and wherein said semiconductor is turned on when the first control signal is of a fourth voltage level, so as to transmit BNC video signals to a display apparatus.

9. A method for automatically selecting video signals from a computer system, said method comprising the steps of:

receiving a synchronization signal from said computer system;

making a determination of whether the signal received from said computer system is a D-SUB synchronization signal or a BNC synchronization signal;

selecting, based on said determination, one driving circuit from a D-SUB driving circuit and a BNC driving circuit; and controlling said selected driving circuit to transmit video signals to a video display apparatus;

wherein said selecting step comprises generating a first output signal, and wherein said controlling step comprises inverting the first output signal to get a second output signal which is applied to one of said driving circuits, and inverting the second output signal to get a third output signal which is applied to another of said driving circuits.

10. A circuit for automatically selecting video signals from a computer system, said circuit comprising:

a detector having an integrated circuit device, said detector disposed to receive a video signal generated by a computer system to drive a video display appearing on a video monitor, and to generate a first control signal in dependence upon identification by said detector of said video signal as one of a D-SUB synchronization signal and a BNC synchronization signal;

an inverter for inverting said first control signal to obtain a second control signal opposite in polarity to said first control signal;

a first driver for transmitting a third synchronization signal derived from said D-SUB synchronization signal to the video display in response to said first control signal; and a second driver for transmitting a fourth synchronization signal derived from said BNC synchronization signal to the video display in response to said second control signal.

11. A circuit for automatically selecting video signals from a computer system, said video signals including a D-SUB synchronization signal and a BNC synchronization signal, said circuit comprising:

detector means including an integrated circuit device for receiving a video signal generated by said computer system to drive a video display, and for generating a first control signal in dependence upon identification of said video signal as one of the D-SUB synchronization signal and the BNC synchronization signal;

inverter circuit means for receiving the first control signal from said detector means, for inverting the first control signal to obtain a second control signal, and for inverting the second control signal to obtain a third control signal;

D-SUB driving circuit means for receiving the third control signal from the inverter circuit means and for generating a D-SUB video signal in response thereto; and BNC driving circuit means for receiving the second control signal from said inverter circuit means and for generating a BNC video signal in response thereto.

12. The circuit of claim 11, wherein said detector means comprises a first input terminal for receiving D-SUB synchronization signals, a second input terminal for receiving BNC synchronization signals and an output terminal connected to said inverter circuit means.

13. The circuit of claim 11, wherein said inverter circuit means comprises first and second inverters, each of said first and second inverters having an input terminal and an output terminal, said output terminal of said first inverter being connected to an input terminal of said D-SUB driving circuit means, and said output terminal of said second inverter being connected to an input terminal of said BNC driving circuit means.

14. The circuit of claim 11, wherein said D-SUB driving circuit means further comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and said second electrode via said channel, said first electrode being connected to a constant voltage source, said second electrode being coupled to send video signals;

a first node connected to said first resistor, a second resistor, a capacitor, and said third electrode;

a second node connected to said capacitor, a third resistor, and a fourth resistor; and a second input terminal connected to said fourth resistor, said second input terminal being coupled to receive video signals.

15. The circuit of claim 11, wherein said BNC driving circuit means comprises:

a resistive impedance providing a first input terminal;

a semiconductor having a principal electrically conducting semiconducting channel, a first electrode coupled to a first side of said channel, a second electrode separated from said first electrode by said channel, and a third electrode controlling electrical conduction between said first electrode and second electrode via said channel, said first electrode being connected to a constant voltage source, said second electrode being coupled to send video signals;

a first node connected to said first resistor, a second resistor, a capacitor, and said third electrode;

a second node connected to said capacitor, a third resistor, and a fourth resistor; and a second input terminal connected to said fourth resistor, said second input terminal being coupled to receive video signals.

* * * * *